United States Patent [19]

Mariner

[11] 3,955,707

[45] May 11, 1976

[54] CONTAINER CLOSURE

[76] Inventor: William Huffington Mariner, S. Park Drive, Extension Rte. 4, Salisbury, Md. 21801

[22] Filed: Oct. 9, 1975

[21] Appl. No.: 621,120

[52] U.S. Cl............................ 220/243; 220/233; 220/327; 220/323
[51] Int. Cl.²................ B65D 45/00; B65D 53/00; B65D 45/28
[58] Field of Search .......... 220/243, 233, 234, 235, 220/327, 323, 246

[56] References Cited
UNITED STATES PATENTS

| 1,797,766 | 3/1931 | Frye .................................. 220/243 |
| 2,426,800 | 9/1947 | Triplett ......................... 220/327 X |
| 3,489,312 | 1/1970 | Hunckler et al. ................... 220/235 |

Primary Examiner—William Price
Assistant Examiner—Steven M. Pollard
Attorney, Agent, or Firm—Larson, Taylor and Hinds

[57] ABSTRACT

A reusable closure for containers having an opening in a surface thereof. A seal of size and shape sufficient to cover the opening in the container and having a bore therethrough is positioned such that the bore generally is aligned with a portion of the opening including opposed edges thereof. A threaded cap has a diameter less than that of the bore, whereby threaded engagement between the cap and opposed edges of the opening is achieved. Tightening the cap holds the seal firmly in place, thereby maintaining a positive closure of the opening. The seal may abut a lip of the container thereby restricting lateral movement of the cap. The seal and the threaded cap may be separate elements or of integral construction. The invention is particularly suited for use in containers having a convenience opening known as pop-top cans.

13 Claims, 7 Drawing Figures

CONTAINER CLOSURE

FIELD OF THE INVENTION

This invention relates to container closures, and more particularly, to closures for containers having a convenience opening known as pop-top cans.

BACKGROUND OF THE INVENTION

Numerous convenience opening devices are known in the art, each suffering from the difficulty of reclosure, that is, an inability to securely cover the container opening in cases of interrupted use, e.g., drinking part of a can of soda. Prior attempts at reusable closures have yielded devices such as that disclosed in U.S. Pat. No. 3,871,547, and have comprised resilient sealing members with a "snap-action" or "clip" type retaining means. These devices are complex to manufacture, and can generally be used for closing can openings only of a particular shap and/or location relative to the rim of the can.

SUMMARY OF THE INVENTION

The present invention combines simplicity and versatility in that it can be used to close a wide variety of can openings in various locations on a can while concurrently providing a positive, reliable sealed closure therefor.

According to the present invention, a closure device is providied comprising a generally flat sealing means, at least the lower side of which comprises resilient material, and including a bore passing completely through the sealing means. A threaded cap is also provided, of radial dimension less than the bore. The sealing means, when positioned on the container with the bore aligned with a portion of the opening in the container, forms a guide for the threaded cap, thereby permitting insertion of the threaded cap into the bore and positioning of the threaded cap over a portion of the opening. In this position, the elements are arranged so as to permit threaded engagement between the threads of the cap and opposed edges of the opening of the container. Further tightening of the cap firmly holds the sealing means against the container surface surrounding the opening thereby closing the opening.

In a preferred embodiment, the sealing means abuts a raised lip of the container, such as the rim around the top of a pop-top can, thereby restricting lateral movement of the threaded cap. Further, according to a preferred embodiment, the shape of the sealing means is substantially the same shape of the opening, but of a sufficiently larger surface area than the opening so as to completely cover the opening. According to an alternative embodiment, the sealing means is substantially circular. In addition, according to a further alternative embodiment, the threaded cap and the sealing means are of integral construction.

Other features and advantages of the invention will be set forth in, or apparent from, the detailed description of a preferred embodiment found hereinbelow.

DESCRIPTION OF THE PREFERRED EMBODIMENT

Figure 1:
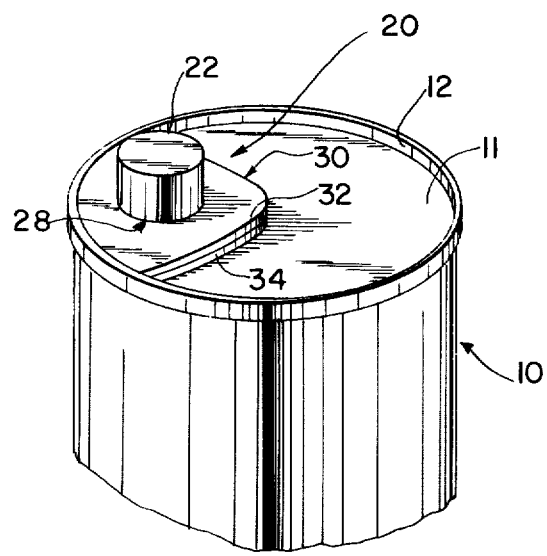
FIG. 1 is a perspective view of a container, the opening of which is sealed closed with a closure according to the invention.
Figure 2:
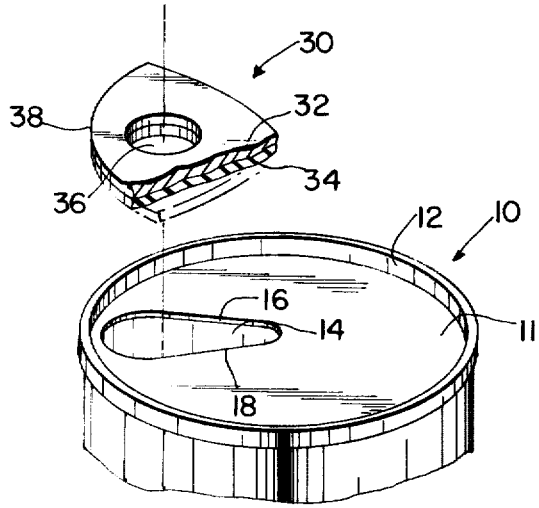
FIG. 2 is an exploded perspective view of the closure shown in FIG. 1.

Referring to FIGS. 1 and 2, a container 10 having a generally flat top 11 and a raised lip 12 surrounding the top 11 is shown. Top 11 has a tear shaped opening 14 therein, typically the result of the use of a convenience opening device known as a pop-top. Two edges of opening 14 are denoted 16 and 18. A closure device, generally denoted 20 is shown in operating position in FIG. 1 and the parts thereof are shown in detail in the exploded view of FIG. 2. Closure 20 is comprised of a threaded cap 26 and a sealing device 30.

Figure 3:
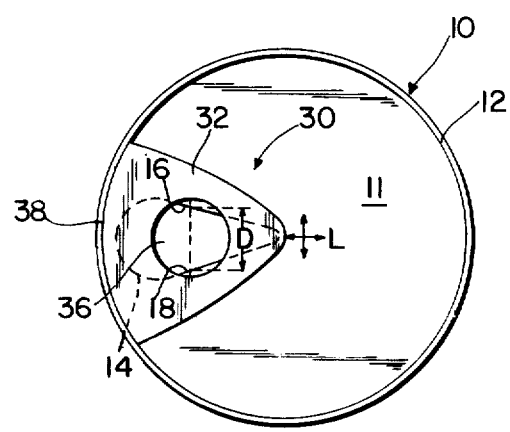
FIG. 3 is a plan view of a container showing the positioning of the sealing means according to the invention.

Threaded cap 26 is comprised of a top 22, and a threaded portion 24, top 22 having a lower surface 28. Cap 26 can be constructed of, for example, a hard, non-toxic plastic. Sealing device 30 is comprised of a support 32 and a resilient material 34 laminated thereto, a bore 36 completely passing through sealing device 30. While resilient material 34 is shown laminated to support 32, it should be appreciated that material 34 and support 32 can be separate elements. Referring to FIG. 3, the shape of a surface of sealing device 30 is such that it is larger than opening 14, and, according to a preferred embodiment, conforms generally to the curvature of lip 12 along one edge thereof. FIG. 3 shows sealing device 30 in a position on top 11 of container 10. Edge 38 of sealing device 30 abuts lip 12 and resilient material 34 completely surrounds opening 14. Bore 36 is aligned with a portion of opening 14 such that edges 16 and 18 are exposed thereby.

Threaded portion 24 of cap 26 is of an overall diameter less than that of bore 36 and of internal diameter, i.e., as measured at the base of its threads, approximately that of D in FIG. 3. Edges 16 and 18 therefore form a nut for receiving the threads of cap 26, which is inserted in bore 36 and rotated, thereby permitting threaded engagement between threaded portion 24 and edges 16 and 18. Cap 26 is rotated until surface 28 abuts and, is further tightened, thereby pressing sealing device 30 and in particular the resilient material 34 thereof, against top 11, sealing closed the opening 14. It will be noted that lateral movement, as represented by the arrows L in FIG. 3, is restricted by edges 16 and 18 and lip 12 co-acting with edge 38 resulting in positive and tight sealing of opening 14.

Figure 4:
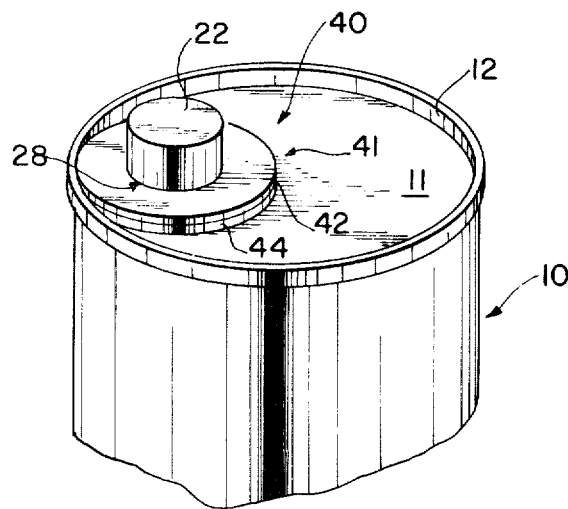
FIG. 4 is a perspective view of a container with a closure in position according to an alternative embodiment.
Figure 5:
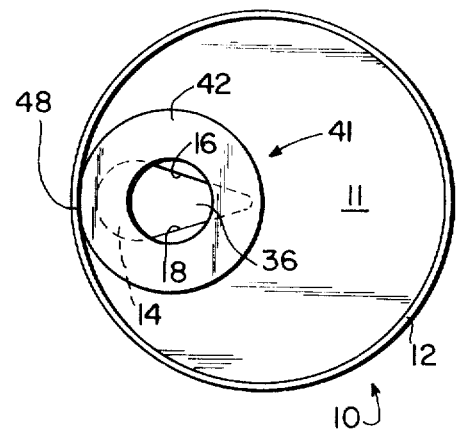
FIG. 5 is a plan view of a container showing the position of the sealing means according to an alternative embodiment.

Referring to FIG. 4, an alternative embodiment is shown. As in FIG. 1, container 10 has a top 11 and a raised lip 12. A closure 40, like the closure 20 of FIGS. 1 to 3, has a cap 26 with a top 22 having a surface 28, and a threaded portion 24 (not shown in FIG. 4). However, in this case, the sealing device, denoted as 41 herein, is round in shape resulting in simplified manufacture thereof. It is comprised of a support 42 and a resilient material 44. As is shown in FIG. 5, the sealing device 41 is positioned similarly with respect to opening 14. However, in this case it abuts lip 12 only at one point, denoted 48. When cap 26 is inserted into bore 36 and rotated therein, in order to permit threaded engagement with edges 16 and 18, support 42 is permitted to freely rotate therewith until friction between top 11 and resilient material 44 holds support 42 firmly in place. As described above with respect to FIGS. 1 to 3, further tightening of cap 26 results in increased pressure between resilient material 44 and top 11 resulting in a positive closure.

Figure 6:
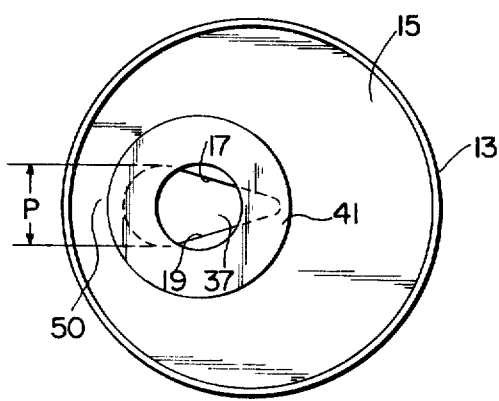
FIG. 6 is a plan view of a container showing the position of the sealing means according to a further alternative embodiment; and, FIG. 7 is a perspective view of a closure device according to an alternative embodiment of the invention.

Referring to FIG. 6, an alternative positioning for sealing closure 41 is shown. Although the positioning of the sealing devices 30 or 41 to abut rim 12 has the advantage of restricting lateral movement of the closure 20 or 40, a container such as 13 having a top 15 might not have a lip, or the opening, denoted 37, may be so disposed as to make abutment difficult. It has been found that the pressure due to the threaded engagement of threads 24 and edges 17 and 19 of openings 37 may be sufficient to hold the sealing device firmly in place due to the friction between resilient material 44 and top 15. Thus, a closure according to the invention will function properly with a space 50 between support 42 and a lip (not shown), thereby illustrating the adaptability of the invention to differing conditions.

There is another advantage to an arrangement excluding abutment with a lip. The threaded portion 24 of cap 26 can be of an outer diameter (across the crest of the threads) less than dimension P at the widest part of tear shaped opening 37. In this case, rather than thread the cap 26 in all the way, it can be pushed freely down into this wide part, then moved sideways to edges 17 and 19 and then tightened one or two turns to complete the sealing effect.

Figure 7:
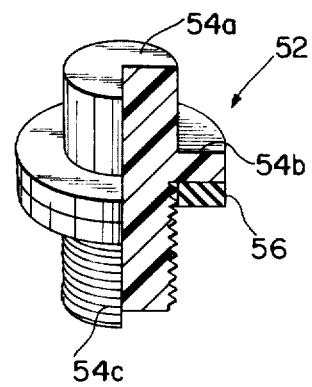

Referring to FIG. 7, a further alternative embodiment for a closure according to the invention is shown. A closure 52 is comprised of a cap portion 54a, a flange portion 54b, resilient material 56 and a threaded portion 54c. Flange 54b additionally serves the function of supports 32 and 42 in the above described embodiments. Closure 52 can be constructed of hard, nontoxic plastic, cap 54a, flange 54b and threads 54c all being of integral construction. Resilient material 56 preferably comprises an annular rubber washer.

Although the invention has been described with respect to exemplary embodiments thereof, it will be understood that variations and modifications can be effected in the embodiments without departing from the scope or spirit of the invention.

I claim:

1. In combination, a container having an opening in a surface thereof, which opening has a pair of opposed edges, and a closure device therefor, said closure device comprising:
    a cap member having an upper part and a threaded lower part,
    a sealing member of an overall size and shape sufficiently large to over the opening,
    said cap member passing through a central portion of the sealing member such that the lower threaded part thereof is located below the sealing member,
    the threads of the threaded cap member being of a size such that they threadedly engage the said opposed edges of the opening,
    said upper part of the cap member comprising means for cooperating with the sealing member to urge the same into tight sealing engagement with the top of the can to cover the opening as the said lower threaded part is threadedly tightened into the opening.

2. The invention of claim 1, wherein said sealing member comprises:
    a support having a bore completely therethrough for receiving and positioning said threaded lower part and being engaged along the upper surface thereof by a lower surface of the said upper part of the member and;
    a resilient sealing material having a bore completely therethrough for receiving said threaded lower part, and engaged by said support member, and compressed thereby when the threads of said threaded lower part engage the opposed edges of the opening.

3. The invention of claim 2 wherein said cap member and said support are of integral construction.

4. The invention of claim 1 wherein a surface of said sealing member contacting the surface of the container is substantially the same overall shape as the shape of the opening.

5. The invention of claim 1 wherein a surface of said sealing member contacting the surface of the container is substantially circular.

6. The invention of claim 1 wherein said cap member and said sealing member are of integral construction.

7. The invention of claim 1 wherein the container further has a lip raised above the surface thereof and said sealing member means abuts the lip.

8. In combination, a container having an opening in a surface thereof, and a lip raised above the surface thereof, which opening has a pair of opposed edges, and a closure device therefor, said closure device comprising:
    a cap member having an upper part and a threaded lower part,
    a sealing member of an overall size and shape sufficiently large to cover the opening,
    said cap member passing through a central portion of the sealing member such that the lower threaded part thereof is located below the sealing member,
    the threads of the threaded cap member being of a size such that they threadedly engage the said opposed edges of the opening,
    said sealing member positioned to abut said lip, thereby restricting lateral movement of said cap member,
    said upper part of the cap member comprising means for cooperating with the sealing member to urge the same into tight sealing engagement with the top of the can to cover the opening as the said lower threaded part is threadedly tightened into the opening.

9. The invention of claim 8 wherein said sealing member comprises:
    a support having a bore completely therethrough for receiving and positioning said threaded lower part and being engaged along the upper surface thereof by a lower surface of the said upper part of the cap member and;
    a resilient sealing material having a bore completely therethrough for receiving said threaded lower part, and engaged by said support member, and compressed thereby when the threads of said threaded lower part engage the opposed edges of the opening.

10. The invention of claim 9 wherein said cap member and said support are of integral construction.

11. The invention of claim 8 wherein a surface of said sealing member contacting the surface of the container is substantially the same overall shape as the shape of the opening.

12. The invention of claim 8 wherein a surface of said sealing member contacting the surface of the container is substantially circular.

13. The invention of claim 8 wherein said cap member and said sealing member are of integral construction.

* * * * *